Patented Sept. 11, 1923.

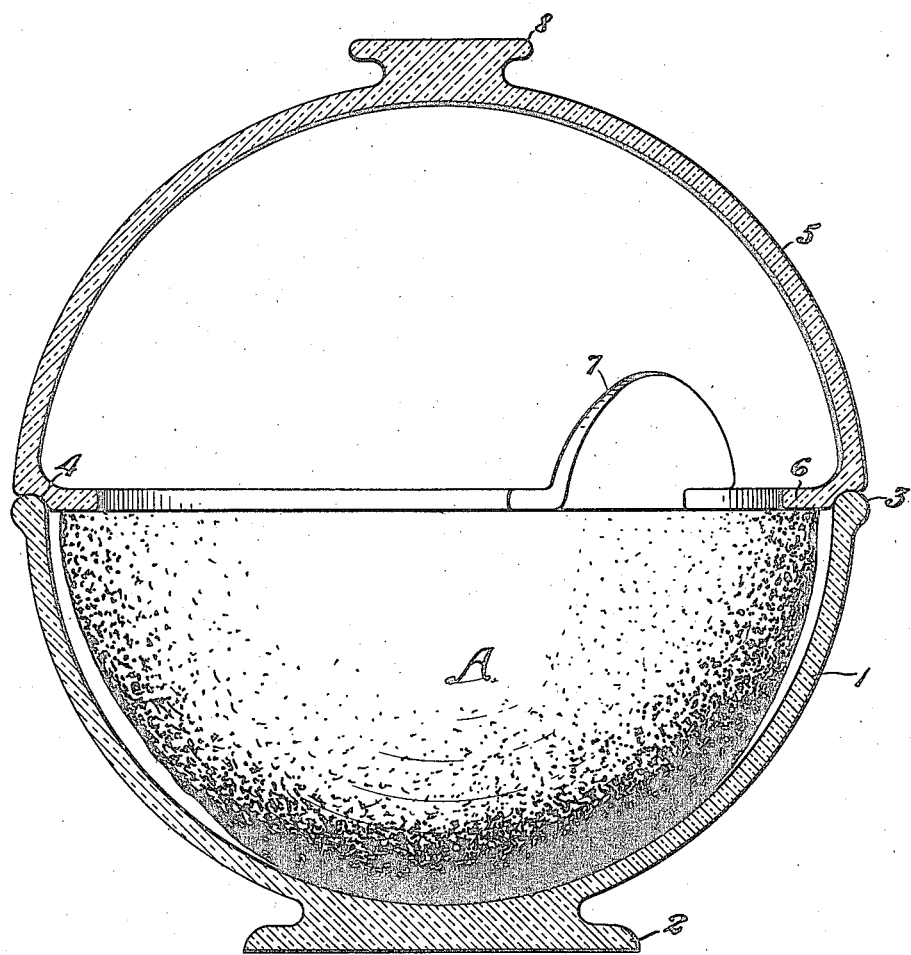

1,467,888

UNITED STATES PATENT OFFICE.

VERNER WATTS AND CHARLES VOGEL, OF MASSILLON, OHIO.

GRAPEFRUIT BOWL.

Application filed April 18, 1922. Serial No. 555,151.

*To all whom it may concern:*

Be it known that we, VERNER WATTS and CHARLES VOGEL, both citizens of the United States, and both residing at Massillon, in the county of Stark and State of Ohio, have invented a new and useful Grapefruit Bowl, of which the following is a specification.

This invention relates to grape fruit bowls and more particularly to a dish of this character provided with a cover to catch the juice from the fruit which ordinarily spatters around the same when a spoon is thrust into the same.

The objects of the invention are to provide a bowl for serving grape fruit or similar citrous fruits, the same having a rotatable lid to prevent spattering of the juice of the fruit, a flange being provided upon the lid for engagement with the fruit to prevent the same from sliding when the spoon is placed therein, an opening being provided in the lid through which the spoon may be entered to remove the pulp of the fruit.

The drawing illustrates a vertical sectional view through a grape fruit bowl embodying the invention, showing a half of a grape fruit located therein.

Similar numerals of reference indicate corresponding parts throughout the drawing.

The bowl is indicated at 1 and provided with a suitable stand or base 2. An annular bead or rim 3 is preferably provided around the upper edge of the bowl to receive the annular groove 4 which is provided in the lower outer edge portion of the lid 5.

The lid and bowl are preferably both formed of glass or other transparent material in order that the grape fruit or other citrous fruit, as indicated at A, may be visible to the person using the same.

An inturned, annular flange 6 is provided around the lower edge portion of the lid and arranged to overlie the upper edge portion of the fruit in order to prevent the same from slipping or turning in the bowl when a spoon is placed therein for the purpose of removing the pulp.

An opening 7, of sufficient size to permit the entrance and removal of a spoon is provided in the lower portion of the lid and a knob or button 8 is provided upon the top of the lid in order that the same may be rotated upon the bowl to allow the user to have access to each of the segments of pulp of the fruit.

It will be evident that the fruit will thus be held in place within the bowl and prevented from slipping or turning therein, as the flange 6 upon the lid will engage practically the entire upper edge portion of the rind of the fruit, holding the same against movement when the spoon is inserted through the opening 7 into the fruit.

It will also be seen that by slowly rotating the lid by means of the knob 8, the opening 7 will be moved into position to allow the spoon to be entered into each segment of the fruit in order to remove the pulp therefrom, while any juice which spatters or squirts from the fruit, due to the insertion of the spoon therein, will strike the interior of the lid, doing away with the annoyance of spattering the juice upon the clothing or person.

We claim:—

A device of the character described including a bowl adapted to receive a half of a citrous fruit and a lid for the bowl fitted for slidable movement upon the bowl and provided with an opening in one side to permit the insertion and extraction of a spoon, said lid having an inwardly disposed flange for engagement with the edge of the rind only of the fruit.

VERNER WATTS.
CHARLES VOGEL.